FLASK MANIPULATING AND MOLD FORMING METHOD

Original Filed June 19, 1961 2 Sheets-Sheet 1

INVENTOR
LOYAL L. JOHNSTON
By Hoopes, Lemon & Buell
his attorneys

FLASK MANIPULATING AND MOLD FORMING METHOD

Original Filed June 19, 1961 2 Sheets-Sheet 2

INVENTOR
LOYAL L. JOHNSTON
By Hoyne, Lemark & Buff
his attorneys

United States Patent Office

Re. 25,571
Reissued May 5, 1964

25,571
FLASK MANIPULATING AND MOLD FORMING METHOD

Loyal L. Johnston, Zelienople, Pa., assignor to Herman Pneumatic Machine Company, Pittsburgh, Pa., a corporation of Pennsylvania Original No. 3,094,750, dated June 25, 1963, Ser. No. 117,999, June 19, 1961. Application for reissue Oct. 15, 1963, Ser. No. 316,801
3 Claims. (Cl. 22—193)

Matter enclosed in heavy brackets [ ] appears in the original patent but forms no part of this reissue specification; matter printed in italics indicates the additions made by reissue.

This invention relates to a flask manipulating and mold forming method. It relates more particularly to a method of flask manipulation and mold formation especially adapted for the formation of foundry molds and particularly foundry molds of compacted finely divided mold forming material for the centrifugal casting of elongated hollow articles such as pipe.

In my copending applications Serial Nos. 118,001 and 118,002, filed of even date herewith, I have disclosed certain methods of and apparatus for forming foundry molds adapted for the centrifugal casting of elongated hollow articles. More particularly, as they relate to the present invention, those applications disclose a method of forming a foundry mold comprising introducing finely divided mold forming material into an elongated flask and with the flask positioned with its longitudinal dimension generally vertical moving a former upwardly through the mold forming material in the flask and thereby forming in the mold forming material an elongated cavity longitudinally of the flask and compacting the mold forming material to form a mold for casting. That method has important advantages, primarily in economy in relation to methods such as that disclosed in my Patents Nos. 2,249,900 and 2,559,161.

I have found that to obtain optimum results in practicing the methods disclosed in my said copending applications it is important to insure rapid and accurate positioning of the flasks relatively to the formers and to expeditiously manipulate the flasks so as to avoid lost time between forming operations. The flasks are large and heavy and it is not feasible in efficient operation to attempt to handle or manipulate the flasks by hand or by conventional means such as an overhead crane. I provide for receiving the flasks either singly or in groups when the flasks are oriented with their longitudinal dimensions disposed generally horizontally, turning the flasks to a position in which the longitudinal dimension of each flask is generally vertical and the flask is disposed generally above a former and accurately positioning the flasks relatively to the formers and clamping the flasks in place for the mold forming operation. After completion of the mold forming operation the flasks are returned to their original position with their longitudinal dimensions generally horizontal and are quickly moved away to make room for other flasks for repetition of the cycle. The flasks will normally be of generally cylindrical shape and when they are of that shape I preferably roll them to and from the mold forming station. When a plurality of flasks are handled in a group I provide for insuring proper spacing between the flasks as they are turned into position with their longitudinal dimensions generally vertical above the formers.

I provide a flask manipulating and mold forming method comprising disposing an elongated flask with its longitudinal dimension generally upright and generally above an upwardly movable former, shifting the flask slightly transversely of its longitudinal dimension to predeterminedly align it with the former, introducing finely divided mold forming material into the flask and moving the former upwardly through the mold forming material in the flask and thereby forming in the mold forming material an elongated cavity longitudinally of the flask and compacting the mold forming material to form a mold for casting. I preferably dispose the flask in lateral juxtaposition to positioning means and engage the flask at the side thereof remote from the positioning means and press it againstthe positioning means to predeterminedly align it with the former.

In a preferred method I dispose the flask with its lower portion in lateral juxtaposition to first positioning means and move second positioning means into juxtaposition with the upper portion of the flask generally above the first positioning means and thereafter engage the flask at the side thereof remote from the first and second positioning means and press it against the first and second positioning means to predeterminedly align it with the former. I desirably turn the flask from a position in which its longitudinal dimension is generally horizontal to a position in which its longitudinal dimension is generally uprght or vertical and set the flask down generally above the former.

In manipulating the flasks when they are positioned with their longitudinal dimensions generally horizontal I preferably roll them (if they are of rollable shape) to the molding station where they are turned to generally upright position as above explained. In moving a flask from its position with its longitudinal dimension generally horizontal to its new position with its longitudinal dimension generally vertical and disposed above the former I preferably elevate the flask, then turn it to upright position and then set it down in position above the former, such manipulation of the flask insuring rapid and efficient operation and avoiding possible interference with the flask such as might occur if it should be attempted to move it into its ultimate position above the former by turning movement only.

I preferably set the flask down generally above the former and then engage the top of the flask to clamp it in fixed position for the forming operation. I may set the flask down generally above the former with its lower portion in lateral juxtaposition to first positioning means, move a head including second positioning means into juxtaposition with the upper portion of the flask with the second positioning means disposed generally above the first positioning means, engage the flask at the side thereof remote from the first and second positioning means and press it against the first and second positioning means to predeterminedly align it with the former and with a portion of the head preferably engaging the top of the flask to clamp it in fixed position.

Other details, objects and advantages of the invention will become apparent as the following description of a present preferred method of practicing the same proceeds.

In the accompanying drawings I have illustrated a present preferred method of practicing the invention and have shown diagrammatically a present preferred form of apparatus suitable for practice of the invention in which—

Figure 1:
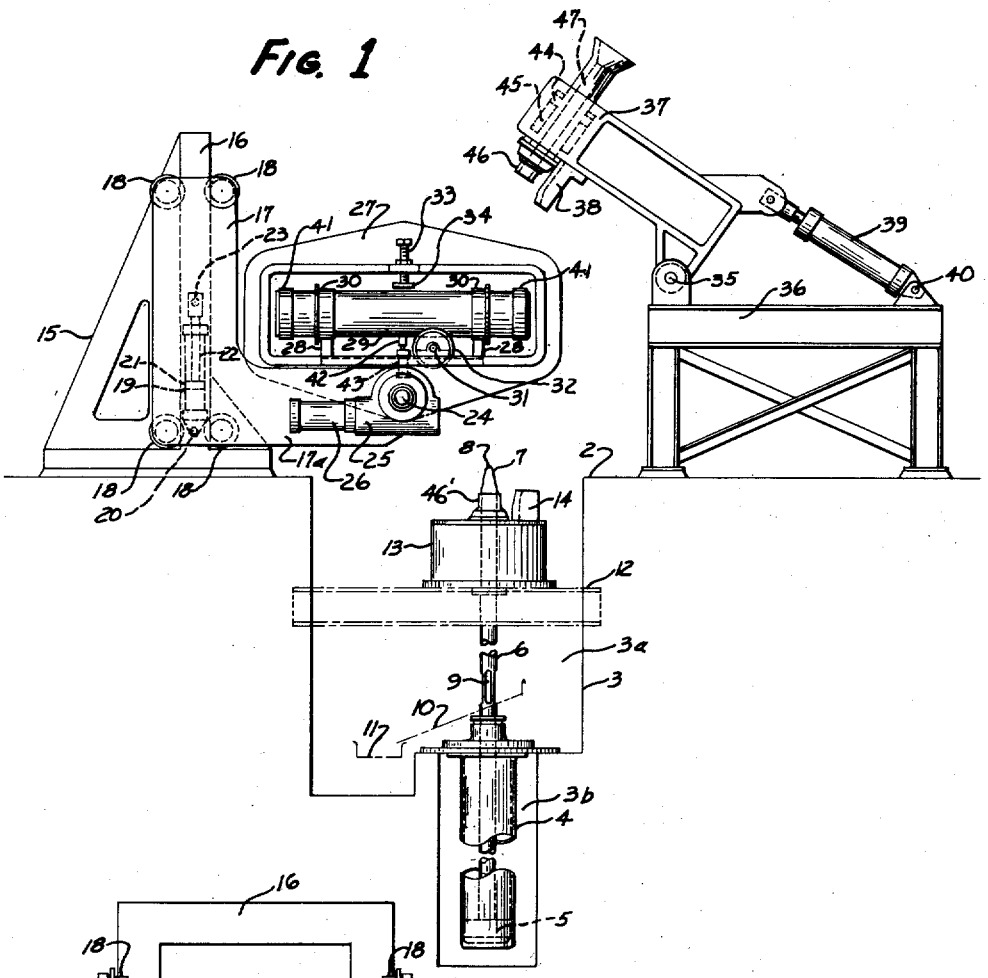
FIGURE 1 is a diagrammatic elevational view of one form of apparatus for carrying out my method.
Figure 3:
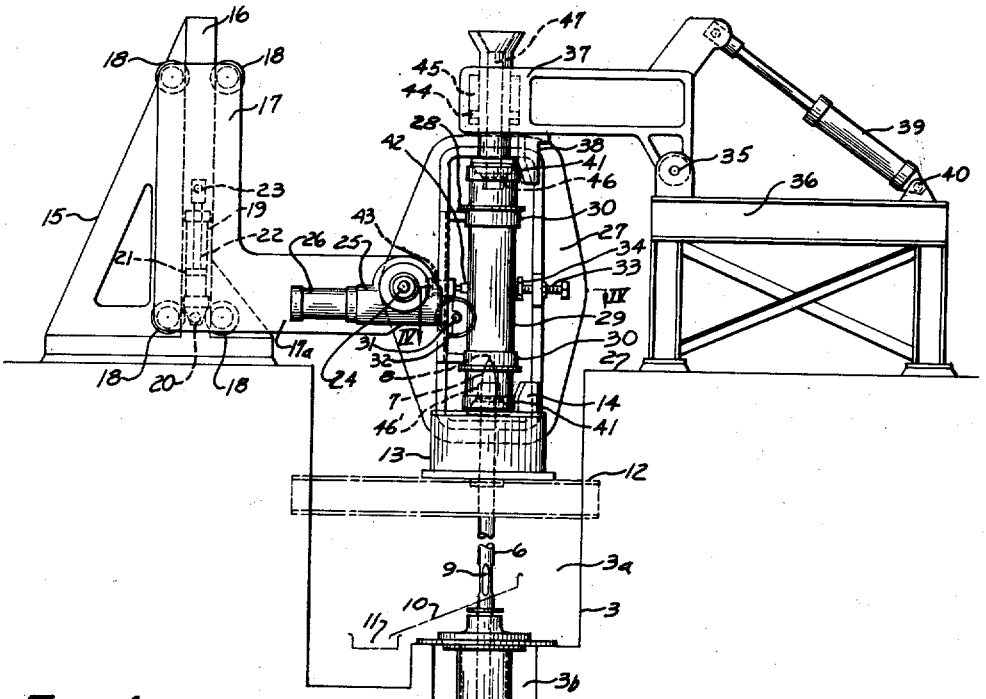
FIGURE 3 is a view similar to FIGURE 1 showing the elements in a different operative position.
Figure 4:
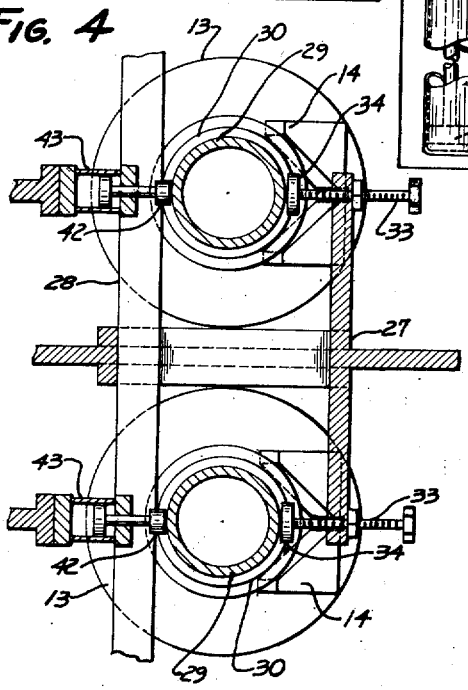
FIGURE 4 is an enlarged detail cross-sectional view taken on the line IV—IV of FIGURE 3.

Referring now more particularly to the drawings, the foundry floor is designated generally by reference numeral 2 and contains a pit 3 having a main portion 3a and a downward extension 3b of smaller size than the main portion 3a. Two cylinders 4 are mounted in the pit in spaced apart relation with their axes vertical. In FIGURES 1 and 3 only one of the cylinders appears as the other is directly behind the one shown. A piston 5 operates in each cylinder 4. Each piston 5 is connected with a former 6 (only one former being shown for the reason above explained) which is disposed generally upright or vertically, each former having a tapered nose 7 and being hollow to receive and hence remove from a flask a portion of the finely divided mold forming material therein during the mold forming step as will be presently described. The former shown is like those of FIGURES 3 and 5 of my said copending applications with an open mouth 8 at the upper extremity of the tapered nose 7 and lateral openings 9 farther down to allow the mold forming material removed from the flask by the former to be discharged from the former. Such mold forming material may be caught by an inclined trough diagrammatically indicated at 10 and delivered to a conveyor diagrammatically indicated at 11. The particular former shown in the drawings of the present application may be replaced by any of the other formers shown in the drawings of my said copending applications as the present invention is not concerned with which specific form of former is employed.

Mounted upon a transverse supporting structure 12 in the pit 3 are two bases 13 through which the respective formers 6 are adapted to move and which preferably serve as guides for the formers. The base 13 is shown only diagrammatically and may be of any of the forms shown in my said copending applications. Each base 13 carries at its top at one side first positioning means 14 in the form of a V block whose function is to participate in the accurate positioning or aligning of a flask with the corresponding former 6.

Figure 2:
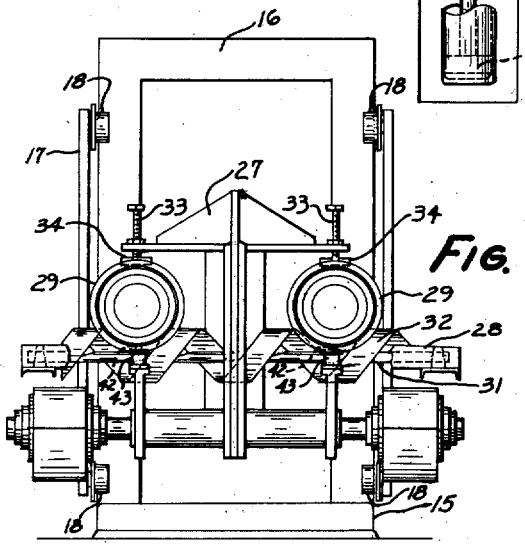
FIGURE 2 is an elevational view looking toward the left in FIGURE 1 at the flask holding cradle and associated mechanism, the other elements of the apparatus being omitted for clarity of showing of the flask holding cradle and associated mechanism.

Mounted upon the foundry floor 2 is a pedestal 15 having an upright guideway 16 for guiding for vertical movement a carrier 17 having wheels or rollers 18 engaging the guideway 16 at opposite sides as shown in FIGURES 1, 2 and 3. A cylinder 19 (omitted from FIGURE 2 for clarity of showing of the elements appearing in that figure) is connected with the pedestal 15 at 20. A piston 21 operates in the cylinder 19 and has a piston rod 22 which passes out of the top of the cylinder 19 through suitable packing and is connected with the carrier 17 at 23. Fluid is admitted to the cylinder 19 above or below the piston 21 whereby the carrier 17 may be raised and lowered at will.

The carrier 17 has a horizontally projecting portion 17a in which is journaled a shaft 24 which carries a pinion (not shown) with which meshes a rack (not shown) disposed in a casing 25 and operated by a piston in a cylinder 26. Hence the rack and pinion operated by fluid under pressure admitted to the cylinder 26 can turn the shaft 24 about its axis.

Fixed to the shaft 24 is a cradle 27 within which are mounted rails 28 adapted to support two flasks 29. Each flask is provided externally with flanged steel tires 30 to enable the flask to roll upon the rails 28. At one step in the cycle the rails 28 will be disposed substantially in a horizontal plane as shown in FIGURE 1 and at such a level as to receive flasks from suitable delivery means such as other rails disposed substantially end to end with the rails 28. Mounted in the cradle 27 is a shaft 31 carrying a helical impeller 32 which cooperates with the flasks 29 as shown in FIGURE 2. The shaft 31 is driven by any suitable means (not shown) such as a motor mounted in the cradle which causes the helical impeller 32 to turn about the axis of the shaft. When flasks are supported on the rails 28 of the cradle 27 they intersect the helical impeller 32 as shown in FIGURE 2 and turning of the shaft 31 causes the helical impeller through its engagement with the flasks to advance the flasks along the rails 28 while at the same time maintaining them in predetermined spaced apart relationship. When the flasks reach predetermined positions in the cradle 27 the shaft 31 is stopped which in turn stops the flasks in predetermined spaced relationship and holds them in position.

The flasks are initially received by the cradle 27 by being rolled thereonto upon the rails 28, being controlled by the helical impeller 32 as above described, and when the flasks have reached predetermined positions upon the rails the shaft 31 is stopped, the carrier 17 is raised and the shaft 24 carrying the cradle 27 is turned through approximately 90° in the clockwise direction from the position shown in FIGURE 1 in which the longitudinal dimensions of the flasks are generally horizontal to a position in which the longitudinal dimensions of the flasks are generally upright or vertical. When the cradle has reached the second mentioned position it may be lowered to set down the flasks on the bases 13, the predetermined positioning of the flasks being such that their respective axes are in the same vertical planes with the respective axes of the formers 6. The flasks are held against falling out of the cradle when the cradle is turned to the second mentioned position by screws 33 having stop members 34 at their ends. If a flask tends to fall out it is engaged by the corresponding stop member 34 and maintained in place.

Pivoted at 35 to a supporting structure 36 is a head 37 carrying at its under surface second positioning means 38 in the form of two V blocks like the V blocks 14 and arranged so that when the head 37 is in operative position as shown in FIGURE 3 the respective V blocks 38 will be directly above the respective V blocks 14 and correspondingly positioned. The head 37 is turned about the axis of the pivot 35 by a piston in a cylinder 39 pivotally carried by the supporting structure 36 at 40. When the head 37 is turned down to operative position as shown in FIGURE 3 the respective sets of V blocks 14 and 38 are vertically aligned.

Each flask 29 has a steel band 41 applied to it externally adjacent but slightly spaced from each end as shown. The bands 41 are adapted to cooperate with the V blocks 14 and 38 to predeterminedly and accurately align or position the flasks relatively to the formers 6. When the flasks are set down on the bases 13 and the head 36 has been moved to operative position as shown in FIGURE 3 each flask is presseed toward the right viewing FIGURE 3 by a piston 42 in a cylinder 43 carried by the cradle 27. This properly positions the flasks relatively to the formers. Thereupon pistons 44 operating in cylinders 45 in the head 37 are moved downwardly to clamp the flasks in place on the bases 13. The pistons 44 may carry patterns 46 for forming pipe hubs or spigots as desired. Likewise patterns 46' may be mounted upon the bases 13.

At the beginning of a cycle with the carrier 17 in its lowered position and the cradle 27 in the position of FIGURE 1 two empty flasks 29 are rolled into the cradle upon the rails 28, the movement of the flasks within the cradle being controlled by the helical impeller 32. As above stated when the flasks have reached predetermined positions in the cradle, i.e., positions with their respective axes in the same vertical planes as the respective axes of the formers 6, the shaft 31 carrying the helical impeller 32 is stopped. The carrier 17 is raised and the cradle 27 is turned 90° clockwise about the axis of the shaft 24 to position the flasks 29 with their longitudinal dimensions upright and in substantial vertical alignment with the respective formers 6. Thereupon the carrier 17 is moved downwardly setting down the flasks 29 upon the bases 13.

When the flasks have been thus set down the piston in the cylinder 39 is operated to turn the head 37 in the counterclockwise direction about the axis of the pivot 35 viewing FIGURES 1 and 3 until the head 37 is in the position of FIGURE 3. With the head in that position the respective V blocks 38 are directly above the respective V blocks 14. At that time the pistons 42 are moved toward the right viewing FIGURE 3 to press the flasks 29 against the V blocks 14 and 38. The bands 41 of the flasks 29 cooperate with the V blocks to accurately position the flasks relatively to the formers 6. The bands 41 may be machined for accuracy. They are, as shown, slightly removed from the ends of the flasks so that any object striking the end of a flask will not damage the band 41 at that end although the portion of the body of the flask projecting beyond the band may be somewhat deformed. Such deformation of the projecting portion of the flask body does not interfere with accurate positioning of the flasks by the pistons 42 and the V blocks 14 and 38 cooperating with the bands 41.

When the flasks have been thus positioned the pistons 44 are moved downwardly to clamp the flasks tightly in position upon the bases 13 and to project the patterns 46 into the upper ends of the flasks. The pistons 44 are formed with openings 47 therethrough from top to bottom and when the flasks have been positioned and clamped in place measured quantities of finely divided mold forming material such as specially prepared foundry sand are introduced into the respective flasks through the openings 47 in the respective pistons 44.

Alternatively, the measured quantities of finely divided mold forming material may be introduced into the flasks 29 when the pistons 44 are in their uppermost positions and indeed preferably when the head 37 is in the position of FIGURE 1 so that direct access may be had to the flasks to introduce the mold forming material directly into the upper ends of the flasks instead of through the openings 47.

Thereupon fluid under pressure is admitted beneath the pistons 5 in the cylinders 4 raising the formers 6 so that they are forced through the mold forming material in the flasks, thereby forming in the mold forming material elongated cavities longitudinally of the flasks and compacting the mold forming material to form molds for casting. The transverse dimension of the openings 47 in the pistons 44 is such that when the cylindrical portions of the formers 6 enter such openings the formers are guided thereby as well as by the bases 13. When the cylindrical portions of the formers have entered the openings 47 the mold forming material is completely enclosed within the flasks and thereupon auxiliary compacting means as disclosed in my said copending applications may if desired be employed to additionally compact the mold forming material in the flasks.

After the molds have thus been formed in the flasks 29 the formers 6 and the auxiliary compacting means if used, are retracted downwardly, the pistons 44 are retracted upwardly, the head 37 is moved to its inoperative position as shown in FIGURE 1, the carrier 17 is raised, the cradle 27 is turned back to the position of FIGURE 1, the carrier 17 is lowered and the flasks 29 with the formed molds therein are rolled out of the cradle by operation of the shaft 31 carrying the helical impeller 32, leaving the cradle empty for the reception of two empty flasks to have molds formed therein in the succeeding cycle of operation.

Features of the apparatus herein disclosed are claimed in my copending application Serial No. 118,000, filed of even date herewith.

While I have illustrated and described a present preferred method of practicing the invention and have shown one form of apparatus suitable for practice of the invention it is to be distinctly understood that the invention is not limited thereto but may be otherwise variously practiced within the scope of the following claims.

I claim:

1. A flask manipulating and mold forming method comprising turning an elongated flask from a position in which its longitudinal dimension is generally horizontal to a position in which its longitudinal dimension is generally upright and setting the flask down above an upwardly movable former whose external transverse dimension is equal to the internal transverse dimension of the mold being formed, introducing finely divided mold forming material into the flask through the upper end thereof when the flask is disposed with its longitudinal dimension generally upright and moving the former rectilinearly upwardly only through the mold forming material in the flask while maintaining the flask and former against relative rotation and by such single upward rectilinear movement of the former forming in the mold forming material an elongated cavity longitudinally of the flask and compacting the mold forming material to form a mold for casting.

2. A flask manipulating and mold forming method comprising moving an elongated flask with its longitudinal dimension generally horizontal to a molding station and at the molding station turning the flask to a position in which its longitudinal dimension is generally upright, setting the flask down above an upwardly movable former and with the lower portion of the flask in lateral juxtaposition to first positioning means, moving a head including second positioning means into juxtaposition with the upper portion of the flask with the second positioning means disposed generally above the first positioning means, engaging the flask at the side thereof remote from the first and second positioning means and pressing it against the first and second positioning means to predeterminedly align it with the former, with a portion of the head engaging the top of the flask to clamp it in fixed position, introducing finely divided mold forming material into the flask through the upper end thereof when the flask is disposed with its longitudinal dimension generally upright and moving the former upwardly through the mold forming material in the flask and thereby forming in the mold forming material an elongated cavity longitudinally of the flask and compacting the mold forming material to form a mold for casting.

*3. A flask manipulating and mold forming method comprising turning an elongated flask from a position in which its longitudinal dimension is generally horizontal to a position in which its longitudinal dimension is generally upright and setting the flask down, introducing finely divided mold forming material into the flask through the upper end thereof when the flask is disposed with its longitudinal dimension generally upright and moving rectilinearly upwardly only through the mold forming material in the flask a former whose external transverse dimension is equal to the internal transverse dimension of the mold being formed while maintaining the flask and former against relative rotation and by such single upward rectilinear movement of the former forming in the mold forming material an elongated cavity longitudinally of the flask and compacting the mold forming material to form a mold for casting.*

References Cited in the file of this patent or the original patent

UNITED STATES PATENTS

| | | |
|---|---|---|
| 181,368 | Smith | Aug. 22, 1876 |
| 586,751 | Adams | July 20, 1897 |
| 878,064 | Herbert | Feb. 4, 1908 |
| 2,875,482 | Hamilton et al. | Mar. 3, 1959 |
| 2,879,563 | Ewing | Mar. 31, 1959 |

FOREIGN PATENTS

| | | |
|---|---|---|
| 606,534 | Great Britain | Aug. 16, 1948 |